United States Patent [19]

Hauwiller et al.

[11] Patent Number: 5,026,514
[45] Date of Patent: Jun. 25, 1991

[54] INCREMENTAL FORMING OF THERMOPLASTIC COMPOSITES

[76] Inventors: Paul B. Hauwiller, 1102 Crabtree La., Mt. Prospect, Ill. 60056; A. Brent Strong, 2250 Pine Creek Cir., Sandy, Utah 84093

[21] Appl. No.: 348,297

[22] Filed: May 5, 1989

[51] Int. Cl.⁵ .................. B29C 43/04; B29C 43/20; B29C 43/36
[52] U.S. Cl. .................. 264/258; 264/324; 264/294
[58] Field of Search ............ 264/257, 258, 294, 250, 264/255, 322, 324, 325

[56] References Cited

U.S. PATENT DOCUMENTS

| | | | |
|---|---|---|---|
| 3,441,641 | 4/1969 | Roberts | 264/257 |
| 3,473,990 | 10/1969 | Simon | 264/257 |
| 3,631,580 | 1/1972 | Swartz | 264/257 |
| 3,751,552 | 8/1973 | Meadors | 264/294 |
| 4,080,416 | 3/1978 | Howard | 264/258 |
| 4,216,184 | 8/1980 | Thomas | 264/257 |
| 4,360,491 | 11/1982 | Holden | 264/294 |
| 4,364,887 | 12/1982 | Becht | 264/258 |
| 4,462,946 | 7/1984 | Goldsworthy | 264/257 |
| 4,752,204 | 6/1988 | Kataoka | 264/294 |

Primary Examiner—Jay H. Woo
Assistant Examiner—Jeremiah F. Durkin, II

[57] ABSTRACT

A method for incrementally mold-forming sections of a fiber reinforced, thermoplastic material into a composite product which has a mold product configuration of non-uniform cross section and/or non-linear configuration. Large laminates are formed by utilizing small to medium sized molds to successively mold incremental sections of the total product. Each section of the laminate is first heated to a flowable condition and is then compressed within the mold cavity to form the desired incremental shape. This process is completed until all parts of the product have been formed utilizing variations in mold components to change geometries within the total part.

10 Claims, 3 Drawing Sheets

INCREMENTAL FORMING OF THERMOPLASTIC COMPOSITES

BACKGROUND OF THE INVENTION

1. Field of Invention

This invention relates to a system and method for manufacturing fiber reinforced thermoplastics into structures having relatively large dimensions. More particularly, the present invention relates to a system and method for manufacturing high modulus and high strength fiber reinforced thermoplastic composites whose product configuration is characterized by a nonuniform cross section or non-linear elongate axis.

2. Prior Art

Although fiber reinforced thermoplastics (FRTP) have only been in commercial production for several years, such composites are receiving increased attention and popularity because of their versatility. For example, composites made of thermosetting resins are limited because of curing procedures which involve cross linking of polymers to a final, irreversible molecular structure. Thermoplastic resins, on the other hand, are stabilized and may be reversibly modified to change configuration. Despite the versatility of the FRTP material, however, fabrication procedures have been limited and somewhat inhibiting to applications of such composite materials for commercial products.

Generally, five methods are recognized as representative of fabrication techniques for FRTP composites. The first of these methods is referred to as matched die forming. In this process, the thermoplastic composite laminate is heated outside a mold and then transferred to the mold area and pressed between two non-heated, matched, rigid molds which are mounted on platens of a press. When this procedures involves replacement of one side of the mold with an elastomer, the process is referred to as hydroforming. Another category within this group is commonly referred to as compression molding, but is primarily used for thermosetting resins, where the material is placed between heated, matched dies. Curing occurs within forming cavities of the molds. Such matched die forming procedures require a press and an oven that is at least the size of the part to be produced. Where parts are large, such as a wing section for aircraft, the size of such a press and oven may stretch beyond economic feasibility.

Another classification of techniques for forming FRTP composites is identified as autoclaving. In this process, the laminate layers are laid in a mold which is sealed with a vacuum bagging assembly. The mold is then placed in the autoclave and slowly heated. Pressure is applied to reduce the void content in the material and increase its mechanical properties. After a time at the softening point temperature, the mold is slowly cooled, allowing for release of the molded product. The disadvantages of autoclaving are similar to those of matched die forming, in that the size of the part is restricted by the size of the autoclave. Forming large composite structures by these methods is often cost prohibitive.

A similar method of FRTP fabrication is referred to as continuous heating, roll forming. This method is similar to roll forming of metals in that a continuous length of thermoplastic composite is passed through a heating section and into a series of forming rollers. This process produces long parts with a constant or uniform cross sectional area. It is similar to pultrusion technology applied to thermosetting resin composites. Although this process can create large composite parts, such parts are limited to cross sections of uniform shapes such as hat sections, C-channels, rods, etc. Techniques for varying cross sectional configuration along the length of a formed or forming structure have been unknown and perceived as infeasible within a competitive manufacturing operation.

Filament and tape winding is a fourth method sometimes used with thermoplastic compositions, as well as with thermosetting resins. In this procedure, a tow or tape of fibers is impregnated with thermoplastic resins. This impregnated tow is heated and applied to a rotating mandrel configured in accordance with desired product shape. Consolidation of the material is provided by a pressure roller. Obviously, the very manner of formation limits such processes to surfaces of revolution and are not well suited for formation of laminate parts on mass production scale.

Finally, a fifth category of fabrication involves diaphragm forming. In this process, a thermoplastic layup packet is placed between two superplastic alloy sheets. The laminate and the cover sheets are placed in an oven. The materials are heated and then pressure formed into a mold. Here again, the fabricated parts are limited in size to the size of the heating and pressure vessel applied. Furthermore, the use of superplastic alloy sheets are costly and not well suited for mass production.

Of these five methods, the dominant fabrication techniques involve the four types which produce component parts by heating and compression of the total part within a single mold. Capital costs in preparing such mold structure are often prohibitively high. For example, larger molds may cost tens or hundreds of thousands of dollars just to have the mold cut to proper configuration. Other capital costs involved in operating machinery to make single components must be added on top of these high mold costs. Such cost increases tend to be geometric and can greatly increase the cost of production where no other options are available.

Such options are limited because continuous production line systems such as pultrusion and roll forming are only useful for parts having uniform cross sections and a linear axis. This is not to say that some pultruded FRTP composite structures may not be heated and bent into other shapes; however, fabrications of non-linear parts and parts having non-uniform cross sections have not been successfully introduced to the plastic industry on a large commercial scale. Furthermore, commercial applications of roll forming, pultrusion and extrusion have generally been limited to die cavities which are both linear and of uniform cross section such that the interception of two parallel planes through the formed composite or mold cavity are geometrically congruous.

OBJECTS AND SUMMARY OF THE INVENTION

It is an object of the present invention to provide a system and method for incrementally mold-forming sections of an FRTP material into a large composite structure which is characterized by a mold cavity or configuration wherein cross sections formed by interception of two parallel planes through the formed composite product or the forming mold cavity are geometrically incongruent.

A more specific object of the present invention is to provide a system and method for forming FRTP products of large shape by incrementally molding component sections of the large shape as part of a semi-continuous mold procedure.

A still further object of the present invention is to provide a system and method for incremental forming of thermoplastic composites into large structures which would otherwise be cost prohibitive under single-pass molding techniques.

Yet another object of the present invention is to provide a system and method for fabricating FRTP composites which incorporates advantages of matched die forming techniques to develop non-uniform and non-linear shapes, but in a fabrication procedure which does not require a single pass or curing step, but allows incremental fabrication of separate parts into a single, integrated composite product.

These and other objects are realized in a mold-forming system and method which utilize separable mold components having opposing mold faces, including at least one mold face defining one side of the product mold configuration and wherein the configuration is characterized by incongruency of two cross sections formed by two intercepting planes with respect to the mold cavity or formed product. Means for positioning the molds are provided for (i) maintaining the opposing mold faces in separated relationship, or alternatively (ii) closing the faces to form the product mold cavity or configuration. A conveyor line is oriented for movement of incremental sections of attached FRTP material between the mold components when separated and includes means for positioning the FRTP material in proper orientation prior to closure of the mold faces. This system includes an oven or other means attached to a conveyor line to modify the FRTP material to a condition wherein the thermoplastic is flowable with respect to its reinforcing fibers. A stabilizing assembly is provided to support the conveyor line and retain the FRTP material in stationary relationship upon closure of the mold faces. Release means are provided to activating separation of the mold faces upon cooling or curing to thereby release the molded increment of the composite. This system includes advanced means for moving the molded increment of FRTP composite from between the mold faces and for concurrently advancing a next increment of material to the mold for closure therein.

This system is utilized to practice the inventive methods described herein, including the steps of (a) preparing a laminate of FRTP; (b) preparing a mold having a mold cavity smaller in size than the product to be formed and wherein cross sections formed by interception of two parallel planes therethrough are geometrically incongruent; (c) preparing the laminate for forming within the mold by bringing the thermoplastic to a flowable condition with respect to its fiber reinforcement; (d) transporting an incremental section of the prepared laminate within the mold; (e) applying forming forces to the prepared, flowable laminate increment to partially reconfigure the laminate to a desired shape; (f) cooling the formed laminate increment to a stable condition; (g) releasing the formed increment from the mold; and (h) removing the formed increment and repeating previous steps until remaining increments of the laminate have been fully formed. Increased versatility can be developed if the mold cavity is capable of modification for different increments.

This system and method enable fabrication similar to match die forming in that fabrication techniques utilize a transfer system, an oven, a press and matched molds. However, the incremental forming process can produce large parts on small to medium-sized equipment. This is done by forming a large laminate in sections rather than all at once. Since only sections of a large laminate are being formed, the press and oven only need to be the size of the section to be formed instead of the size of the entire part. This procedure greatly reduces capital costs, as well as provides for a semi-continuous fabrication procedure with its attendant economies.

DETAILED DESCRIPTION OF THE INVENTION

Figure 1:
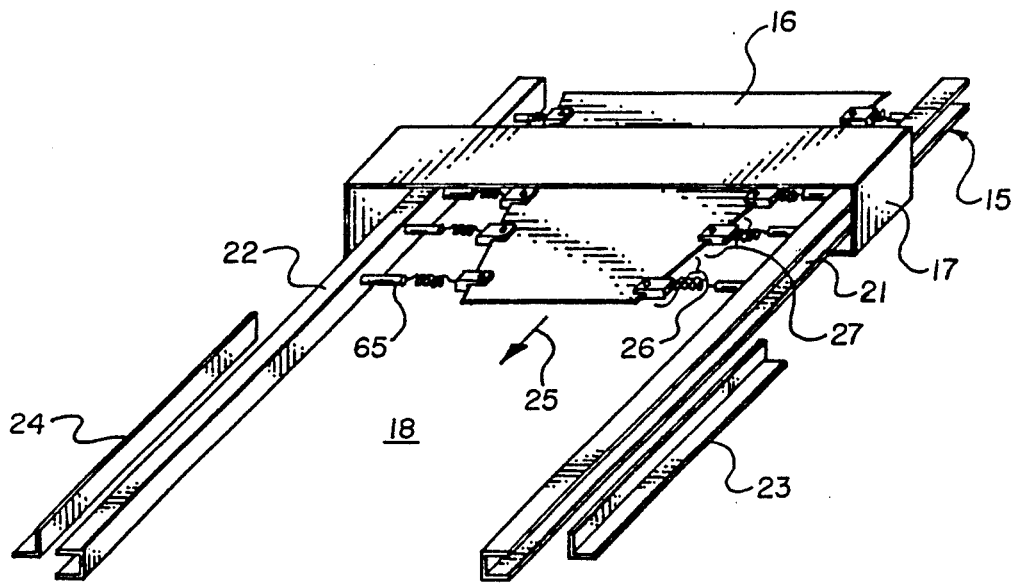
FIG. 1 shows a graphic illustration of an incremental forming system constructed in accordance with the present invention.
Figure 2:
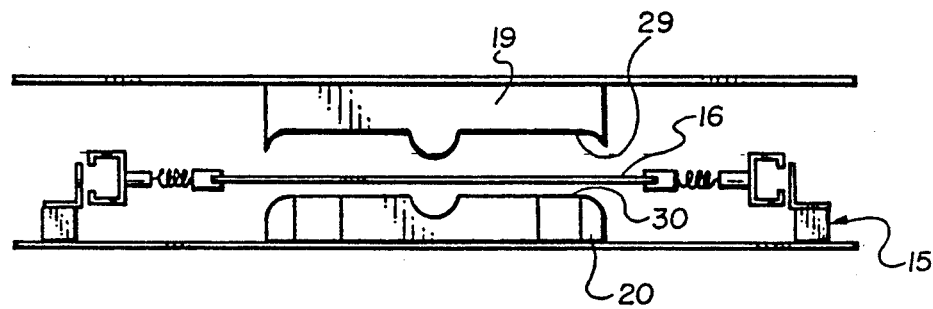
FIG. 2 shows an end view of the system illustrated in FIG. 1, including mold elements.

Referring now to the drawings:

FIGS. 1 and 2 graphically illustrate a fabrication system for incrementally mold-forming sections of a fiber reinforced, thermoplastic (FRTP) material in accordance with the present invention. Four general components enable the fabrication process and include a transfer or conveyor line 15, FRTP material 16 attached thereto for processing, an oven 17 or other means for raising the temperature of the thermoplastic to a desirable level to be discussed hereafter, and mold structure forming the desired shape in the mold area 18, including modular molds 19 and 20 (FIG. 2).

In the illustrated embodiment of FIG. 1, the conveyor line or transfer system consists of transfer rails 21 and 22 which are mounted on roller bars 23 and 24 which permit the rails 21 and 22 to slide along a conveyor line of movement 25. This system enables transfer rails to provide a low friction method for moving the laminate 16 along the conveyor line 25 through an oven 17 or other heating area to mold area 18. Here the material 16 is suspended in a stationary phase while mold halves 19 and 20 compress the material 16 to the desired configuration. At the same time, the mold halves act as a heat sink and reduce the temperature of the thermoplastic to a solid-like or stable state, allowing release of the opposing molds from the fabricated part. The transfer rails 21 and 22 then move a subsequent section of the material 16 into the mold area. Because incremental lengths 26, 27, etc. are separately molded, the mold sizes may be small and easily controlled. Similarly, small sections of the FRTP material may be heated sequentially. These features greatly reduce costs of production and capital investment as compared to techniques for molding the total component in a single compression.

In a generic form, the proposed system for incremental mold-forming of FRTP materials comprises separable mold components 19 and 20 having opposing mold faces 29 and 30 for defining the product mold configuration. In some applications, only one mold face need have the required mold configuration, such as in a hydroforming system or in processes utilizing vacuum forming or similar methods. In all cases, this mold configuration is characterized by a non-uniform cross section or by a non-linear mold cavity.

Figure 5:
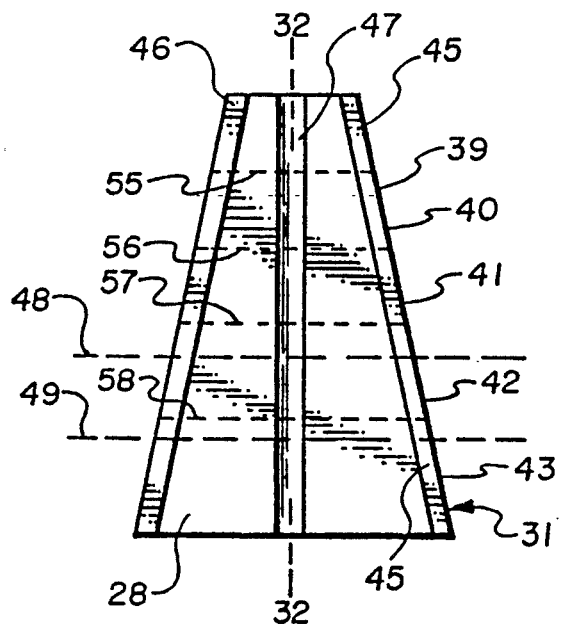
FIG. 5 illustrates an example of a part having non-uniform cross sections which is constructed from the mold components of FIG. 4.
Figure 6:
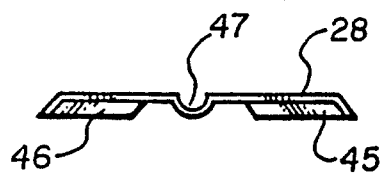
FIG. 6 shows an end view taken from the bottom of the structure illustrated in FIG. 5.

For example, FIGS. 5 and 6 illustrate the incrementally formed part 31 having a non-uniform cross section along its longitudinal axis 32. It will be apparent to those skilled in the art that such a part would be impossible to form by pultrusion processes utilizing conventional dies which have a cavity of uniform cross section, providing a mold chamber to cure the resin to a solid state. Indeed, it has been perceived to be impractical to prepare a FRTP product of non-uniform cross section by progressive curing such as is accomplished in extrusion or pultrusion procedures. The present invention, however, provides such a process by incrementally forming each section of the part with its differing geometry developed by changing molds as will be described in greater detail hereafter.

For purposes of description herein, the distinction between pultrusion or extrusion die cavities and the inventive mold cavity of the present invention are characterized by one of at least two features. In one case, the present mold cavity will be formed by a plurality of mold elements 34, 35, 36, 37 and 38 (FIG. 4) which are sequentially substituted into the mold press for impression upon sequential increments 39, 40, 41, 42 and 43 of the final part. The cross section of these parts is more clearly seen in FIG. 6, which shows an end view of the molded product 31 illustrated in FIG. 5. The lateral, slant side walls 45 and 46 are readily seen in FIG. 6, with the center channel 47 being configured with a semi-circular curvature.

This description of having a non-uniform cross section is mathematically defined by cross sections formed through the composite product by two parallel planes 48 and 49. It will be readily apparent to those skilled in the art that these respective cross sections will be geometrically incongruent because of the differing lateral dimensions. It is to be understood that the suggested geometry having curvature 47 and diverging side walls 45 and 46 is merely representative of the non-uniform condition. Other forms of channels and rib structure in diverging relationship can readily be envisioned, based on the principles set forth herein.

Figure 7:
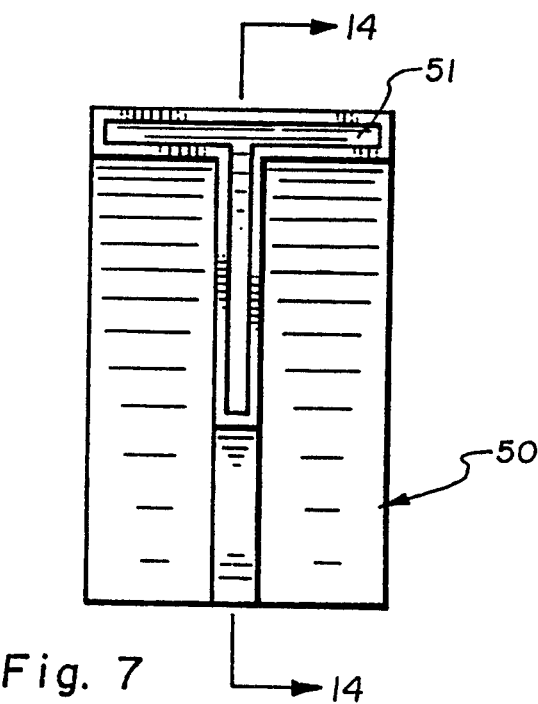
FIG. 7 illustrates an alternate embodiment of the present invention illustrating a non-linear mold cavity.
Figure 8:
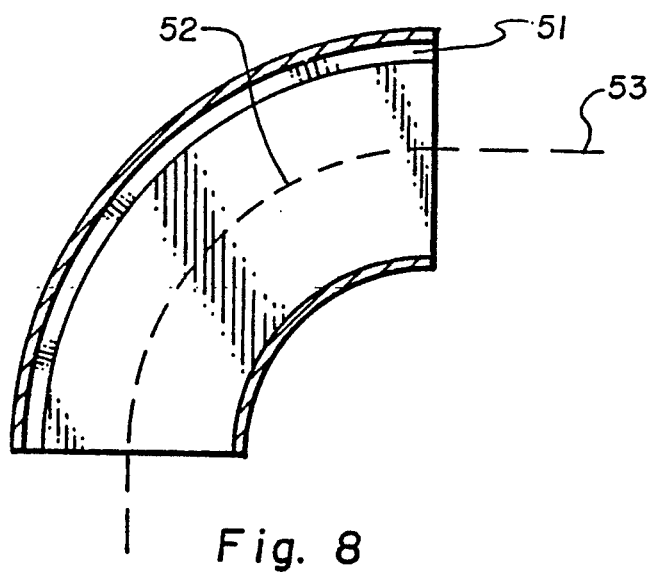
FIG. 8 shows a cross-section taken along the lines 14—14 of FIG. 7.

An additional application of the present inventive concept could be applied where non-linear die cavities are involved. For example, FIGS. 7 and 8 illustrate a T section mold 50 wherein the mold cavity 51 represents an arcuate movement path 52, as contrasted to a linear path 53. Whereas prior art techniques would not easily permit continuous molding (such as pultruding) a part having a non-linear axis, the present invention provides a method of incrementally forming such components. These distinctions of non-uniformity in cross section and non-linear axis for the formed part will be more apparent based on the following description.

Figure 4:
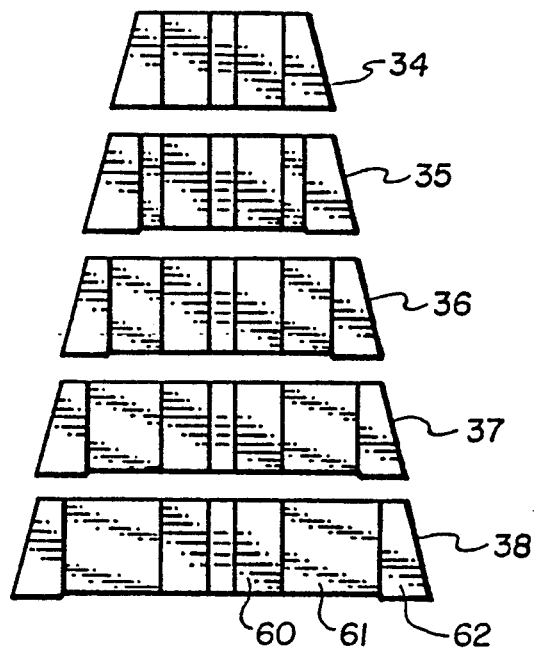
FIG. 4 illustrates a plurality of mold components which may be interchangeably applied to form a mold cavity to prepare a product having non-uniform cross sections.

The preferred application at the present is as a system and process for incrementally forming sections of a product characterized by non-uniform cross section, as illustrated by the incongruent cross sections of two intercepting planes (48 and 49 in FIG. 5). As has been previously indicated, separate mold elements 34 through 38 in FIG. 4 are utilized to press the respective sections 39 through 43 of the molded part. Each part has its own changing geometries but includes at least one of junctures 55, 56, 57 and 50 which establish continuity for the non-uniform geometries of the mold cavity. For example, side wall 45 has a continuously diverging separation distance from the arcuate channel 47. The mold cavities 34-38 are constructed such that this side wall 45 is formed as a continuous element having a substantially straight continuity along its full length. Similarly, the continuity of the opposing side wall 46 is preserved in each respective mold element 34-38.

By utilizing modular mold elements, each incremental stage of formation can be controlled to preserve continuity of converging/diverging ridges, channels and other non-uniform geometries. Generally, the respective stages of forming each increment will include providing overlap across each of the respective junctions 55-58 to maintain continuity of fiber and thermoplastic material, as well as continuity in geometries.

A principal advantage of the present invention arises because of the great variety of design approaches which may be applied by utilizing increment forming procedures with modular mold elements. By segmenting a large product or part to be formed into a plurality of incremental parts, a single mold apparatus can be applied, but on a much smaller and more economical basis. Each of the various increments can be specially formed by modular mold elements which are merely inserted into the mold as that portion of the fabrication process is accomplished. Indeed, modular elements may even be changeable for various applications, particularly in a design such as is illustrated in FIG. 4. In such a case, the common angles of the ridges remain the same, with the only variation being the width of the component mold element. In such an instance, additional flat plates may be inserted to extend the width of the mold element, utilizing the same side wall channel as was used with the previous increment. This enables formation of virtually any size of plate section 28 in combination with the changing geometries 45 and 46. In the example shown in FIG. 4, variations in shading represent modular elements for forming flat section 60, side wall sections in converging/diverging orientation 61 and excess, lateral trim material 62. Actual techniques for preparing a mold to embody the structure represented in FIG. 5 is well known in the art and needs no further description.

In summary, it will be apparent to those skilled in the art that the principles of the present invention enable use of mold designs wherein the product configuration may be characterized by variable width dimensions, variable thickness dimensions and variable geometries, including ridges and channels.

It will also be apparent that means are required within the fabrication system for positioning the mold elements to (i) maintain the opposing mold faces in separated relationship while the laminate is brought into position and (ii) for closing the faces to form the product mold configuration. Here again, actual mold positioning means are well known from prior art techniques and need no further explanation. Similarly, graphically depicted mold elements 19 and 20 are representative of the variety of molding techniques which can be applied to the present concept.

Figure 3:
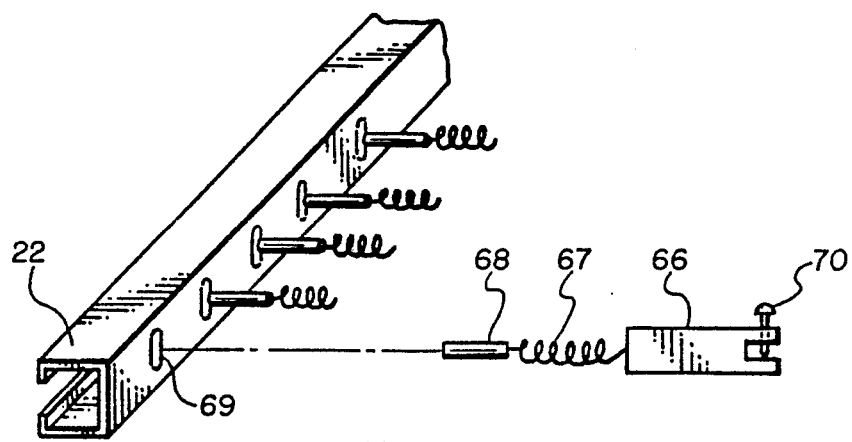
FIG. 3 gives a geometric detail of an attachment system for mounting a FRTP laminate within the transport component of the system.

With respect to transport of the laminate along the conveyor line for heating and subsequent forming, the illustrated transport system of FIG. 1 suggests several advantages. This system provides for attachment of the full laminate structure 16 which is to be formed into a single, integral composite. This laminate 16 is attached to the transfer rails 21 and 22 by means of clamps which provide for releasable attachment to opposing edges of the FRTP material. One embodiment of such clamp means is illustrated in FIG. 3, including one clamp element 66 attached to a spring 67 to enable spring tension to be applied to the laminate in its attached configuration. This clamp assembly 66 and 67 is coupled to a locking pin 68 which mounts in a receiving port 69 in the transfer rail 22 or other form of track. The laminate is captured in the clamp 66 by at least one release pin 70 which retains the material until the total laminate has been processed through the various incremental forming stages.

Once the laminate is attached between the respective tracks or transfer rails 21 and 22, the complete structure is prepared for transport through the fabrication system as an integral unit. Specifically, the whole combination of transfer rails, clamps and attached laminate move collectively through the oven 17 and mold area. Upon completion of forming the material, the conveyor line advances the formed increment from the mold, placing the next increment within the mold for forming in the correct position. By positioning the oven 17 immediately prior to the mold area, the increment about to be formed is brought to proper temperature such that the material is ready for forming upon advancement into the mold cavity. This relative positioning of the oven with respect to the mold cavity will become more clear in the following description of procedural steps for incrementally forming such FRTP products.

Prior to giving a detailed description of the process, some explanation of laminate preparation is appropriate. As used herein, laminate has reference to any layered arrangement of thermoplastic material and fiber. Specifically, the particular product to be formed will already have been engineered for appropriate quantity and orientation of fibers within one or more sheets of thermoplastic material. Actual techniques for layup of these respective layers of fibers and resin are well known and will often include roving, random mat, weave, tape and various other forms of fiber arrangements, sandwiched within one or more sheets of thermoplastic resin.

When the present invention is applied to nonconsolidated layers of fiber and plastic, the arrangement is typically loose, with numerous pockets of entrapped air between layers.

Once the nonconsolidated laminate is prepared with appropriate thickness and composition, it is clamped within the conveyor line as previously described and attached to the transfer rails 21 and 22. In the illustrated embodiment, these clamps are made of 0.625 inch square aluminum bar stock and are machined as illustrated. At least one pin or screw 70, and preferably two, are used to hold the material within the jaws of the clamps. Springs 67 connected to the clamps are selected to exert approximately 950 grams of load when the laminate is being held (with the laminate weighing approximately 300 grams). Five clamps, positioned at four inch intervals are used to support each of two sides of the laminate.

This clamping system allows the laminate to move both horizontally and vertically. The laminate moves horizontally during the forming process as the laminate is pulled into the mold to conform to the contours of the mold face. The springs provide the laminate with horizontal movement capacity. The clamping system also permits vertical movement to allow the laminate to be raised above the surface of the mold after forming has been completed. Various ways can be envisioned to provide for vertical movement, and include the use of vertical slotted tracks to allow the springs to lift upward in the attached rails.

Once the laminate 16 is properly positioned in tension between the opposing rails, the transfer rails are then mounted on the roller bars 23. Such roller bars provide a low friction transfer mechanism to move the laminate from the preliminary assembly area into the oven or heating area and subsequently into the molding area 18. These roller bars are made of a 24 inch length of angle iron and include roller bearings which were mounted at each end.

The first stage of actual fabrication requires that the thermoplastic material be brought to a "flowable" condition. This condition requires that the polymer be able to flow in response to applied forces with respect to its fiber reinforcement. Although such a state may not be equivalent to a liquid, polymer movement must be sufficient to enable mold formation of the component when compressed within the mold structure. Thermoplastic materials are typically brought to this condition by use of a heating oven.

In the present embodiment, the oven consists of a heating panel and controller with an insulated casing. The heating panel is made from $18 \times 21 \times 1.25$ inch 6061 aluminum plate. Eight 750 watt, 250 volt, 16 inch long cartridge heaters are inserted into holes within the plates at even intervals. A thermocouple is mounted on one side of the plate between two of the cartridge heaters. A three inch thick insulating casing surrounds the heating panel to create an oven.

In the present incremental forming system, the oven is only required to heat a portion of the laminate corresponding roughly to an area slightly larger than the area to be immediately molded. The extent of material to be heated depends in part upon the strain-to-failure of the fibers, as compared to the strain that will be required of the fibers during molding. This molding strain is affected by the degree of contouring within the mold and the size of the forming section. The smaller the ultimate fiber strain and the more complex the mold shape, the greater size of the section that must be heated.

Since the fibers in the molding area are moving during forming and the fibers in the cold or solid material are not capable of movement, such fiber strain and stress occurs. The actual amount of stress and strain needs to be calculated to determine if it will be below the ultimate limitation as previously described. The stress will move through the laminate as the various sections are formed incrementally and will eventually be released out the ends of the fibers upon completion of formation.

These preliminary matters of laying up the laminate in non-consolidated form and bringing the thermoplastic component to a flowable condition with respect to its fiber reinforcement are the key steps to be completed prior to actual forming of the product within the mold.

Actual preparation of the mold cavities has been previously discussed, including the respective features of non-uniform cross section and/or non-linear axis. Once the first incremental section of the laminate has been heated within the oven to the required flowable softening point, this section is then transferred to the mold forming area. This forming area consists of a forming press and a pair of matched modular molds mounted on its platens. Generally these platens need to be parallel with one another and must be able to close fast enough so that the laminate won't cool down before forming. In addition, the press should be capable of application of at least 100 psi along its entire work area to insure proper forming of the enclosed incremental part. This has been previously mentioned, other forming techniques may be applied as will be known to those skilled in the art.

It should be noted that the present technique involves bringing the thermoplastic material to flowable condition and utilizing substantially cold mold elements to transfer heat from the material at the same time the material is being formed to its proper configuration. As the cold molds draw heat from the laminate, the laminate is stabilized to its final configuration and form. In the illustrated embodiment, this process takes approximately five minutes. Following this cooling stage, modular molds are then separated and the laminate is released and raised above the mold.

During this forming process, the next increment to be formed has been subject to heating of the oven and is now at appropriate temperature for insertion within the mold. This process is repeated for each successive increment until the complete part is formed.

As was indicated in preceding sections, the preferred embodiment of the system is to utilize molds which are modular in form and which have interchangeable parts. After one increment of the laminate is formed and the laminate is lifted above the mold, the required changes are made to mold elements to provide new geometry for the mold cavity. It is helpful to provide for overlap of formed sections such that part of the previously formed section rests within the mold cavity during processing of the next section. In the present case, approximately one inch of overlap was provided to prevent a line of definition between sections from being formed.

Although the preceding procedure was oriented toward fabrication from non-consolidated layers of fiber and thermoplastic material, the same operations can be applied toward consolidated sheets of FRTP. In fact, testing has shown that fiber content, fiber placement, tensile strength, uniformity of thickness and other parameters which measure the quality of such products are even more improved where preconsolidated sheets of FRTP are formed by this incremental process.

As mentioned earlier, this process can also be utilized to mold non-linear geometries. This is illustrated in FIGS. 7 and 8 with respect to a T cross section. In accordance with this process, a preconsolidated T laminate formed by roll forming, pultrusion or other linear processes is prepared in accordance with the previous steps wherein the thermoplastic material is brought to a flowable condition by heating or other treatment. An increment of this cross section is then introduced into the mold cavity 51 which would be at elevated temperature to permit the T to be reformed to the new, non-linear shape when fully inserted. Once the incremental section of the part is housed within the mold, temperature reduction is accomplished and the cured part is then pulled free from the mold cavity, introducing the next heated section for forming into a non-linear configuration. This incremental forming procedure is applied sequentially until the full length of the product is fabricated. Obviously, this technique can be applied in numerous geometric variations.

It will be apparent to those skilled in the art that the specific examples set forth in this disclosure has been meant for illustration, and should not be considered limiting, except as set forth in the following claims.

I claim:

1. A method for forming an object by incrementally mold-forming sequential component sections of a continuous length of fiber reinforced thermoplastic material into a composite product; said method comprising the steps of:
   (a) preparing a laminate of fiber reinforced thermoplastic material;
   (b) preparing at least one section of a laminate for forming by bringing the fiber reinforced thermoplastic material in said at least one section to a flowable condition with respect to the fiber reinforcement of said at least one section;
   (c) transporting said at least one section of the prepared laminate to a forming area;
   (d) applying forming forces to said at least one section to reconfigure said at least one section to a first desired configuration;
   (e) cooling the formed at least one section to a stable condition;
   (f) removing the formed at least one section from the forming area;
   (g) preparing at least one other section of the laminate for forming by bringing the fiber reinforced thermoplastic material in said at least one other section to a flowable condition with respect to the fiber reinforcement of said at least one other section;
   (h) transporting said at least one other section of the prepared laminate to a forming area;
   (i) applying forming forces to said at least one other section to reconfigure said at least one other section to a desired second configuration, said desired second configuration being different than the first desired configuration of said at least one section;
   (j) cooling the formed at least one other section to a stable condition;
   (k) removing the formed at least one other section from the forming area; and
   (l) repeating steps g) through k) until said product is fully formed.

2. A method as defined in claim 1, wherein the step of bring the fiber reinforced thermoplastic material to the flowable condition comprises applying a heating source to the material prior to transporting the prepared laminate to the mold.

3. A method as defined in claim 1, wherein the step of preparing a laminate fiber reinforced thermoplastic material comprises the specific step of selecting fiber arrangements and sheets of thermoplastic material and laying up a nonconsolidated stack of said components in accordance with design criteria for the part to be fabricated.

4. A method as defined in claim 1, wherein the step of preparing a laminate comprises the specific step of selecting a consolidated sheet of thermoplastic material in substantially planar form and having a thickness and fiber content meeting design specifications for the part to be fabricated.

5. A method as defined in claim 1, wherein the transporting step includes attaching the prepared laminate of step a) to a conveyor line in tension, and conveying successive incremental sections of said prepared laminate to said forming area.

6. A method as defined in claim 1 wherein said steps of applying forming forces include applying a mold to a section of the laminate.

7. A method as defined in claim 6 wherein the step of applying a mold to a section of the laminate further includes changing the configuration of the mold prior to applying the mold to another section of the laminate.

8. A method as defined in claim 7, wherein the step of changing the mold configuration comprises selecting replacement mold elements which will form continuations of nonuniform configurations in adjacent sections of the laminate.

9. A method as defined in claim 8, further comprising the step of forming converging channels within the mold cavity as part of the continuous nonuniform configurations.

10. A method as defined in claim 9, further comprising the step of forming converging ridges within the mold cavity as part of the continuous nonuniform configurations.

* * * * *